June 30, 1925.  
C. DRISCOLL  
NUT LOCK  
Filed Nov. 20, 1924
1,544,378
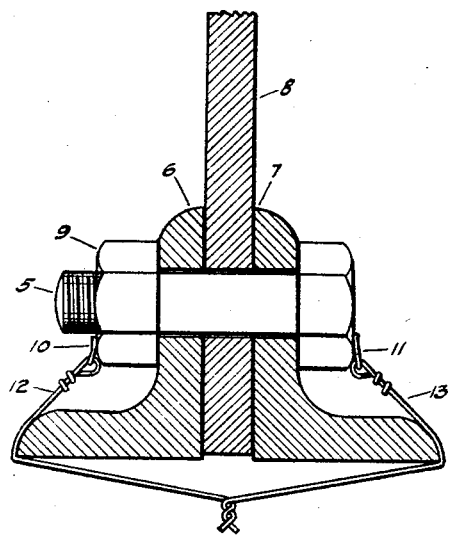
Witnesses  
Frank M. Collins
Inventor  
Con Driscoll  
By Shepherd Campbell  
Attorneys Patented June 30, 1925.

1,544,378

UNITED STATES PATENT OFFICE.

CON DRISCOLL, OF OILFIELDS, CALIFORNIA.

NUT LOCK.

Application filed November 20, 1924. Serial No. 751,121.

*To all whom it may concern:*

Be it known that I, CON DRISCOLL, a citizen of the United States, residing at Oilfields, in the county of Fresno and State of California, have invented certain new and useful Improvements in Nut Locks, of which the following is a specification, reference being had therein to the accompanying drawings.

This invention relates to nut locks and it has for its object to provide an improved assembly of a nut, a bolt and associated elements for locking the nut against turning with respect to the bolt.

Further objects and advantages of the invention will be set forth in the detailed description which follows:

The figure shown in the accompanying drawing is a view partly in section and partly in elevation illustrating the nut and bolt associated with the parts to be held together and with the nut locked against turning with respect to the bolt by the present invention.

For purposes of illustration I have shown the bolt 5, passing through angle plates 6 and 7 and interposed plate 8, and serving, in conjunction with the nut 9, to bind these parts together. However it is to be understood that the angles 6 and 7 and web or plate 8 form no part of this present invention because the device is adapted for use, irrespective of the particular shape of the parts that are traversed by the bolt. In carrying out the invention I secure eyes 10 and 11 to the outer face of the nut and the outer face of the head of the bolt respectively. These eyes may be of any suitable material and of any suitable shape and they are preferably secured in place by welding. Wire strands 12 and 13 are engaged with the eyes 10 and 11 and extend longitudinally of the bolt and across the parts traversed by the bolt and are twisted into engagement with each other as indicated at 14.

I preferably make the eyes 10 and 11 heavier and stronger than wires 12 and 13 so that in the case of any unusual strain it will be the wires that give instead of the eyes. Thus a new wire may be readily put in place if necessity requires. The eyes 10 and 11 constitute permanent parts of the nut and bolt respectively and these nuts and bolts are to be placed upon the market as articles of manufacture with the eyes constituting fixed parts thereof.

It is to be understood that the invention is not limited to the particular construction illustrated because other forms of eyes may be employed and other ways may be resorted to of attaching them to the nut and bolt without departure from the basic principle involved.

Having described my invention, what I claim is:

In a device of the character described the combination with a bolt and a nut adapted to be threaded thereon, of eyes secured to the outer front face of the nut and the outer front face of the bolt respectively and projecting outwardly beyond said faces in the general direction of the length of the bolt, said eyes being adapted to have wire strands passed therethrough which extend longitudinally of the bolt and about the part traversed by said bolt, said eyes being heavier and stronger than the wire strands to insure that the latter will break, before said eyes.

In testimony whereof I hereunto affix my signature.

CON DRISCOLL.